United States Patent
Lin et al.

(10) Patent No.: US 12,479,417 B2
(45) Date of Patent: Nov. 25, 2025

(54) SYSTEM AND METHOD FOR TIRE BLOWOUT DETECTION USING WHEEL SPEEDS

(71) Applicant: GM Global Technology Operations LLC, Detroit, MI (US)

(72) Inventors: Wen-Chiao Lin, Rochester Hills, MI (US); Xinyu Du, Oakland Township, MI (US); Ao Li, Tempe, AZ (US); Yan Chen, Chandler, AZ (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 219 days.

(21) Appl. No.: 18/318,934

(22) Filed: May 17, 2023

(65) Prior Publication Data

US 2024/0383468 A1    Nov. 21, 2024

(51) Int. Cl.
  *B60W 30/02*   (2012.01)
  *G01M 17/02*   (2006.01)
  *G07C 5/08*    (2006.01)

(52) U.S. Cl.
  CPC ............ *B60W 30/02* (2013.01); *G01M 17/02* (2013.01); *G07C 5/0808* (2013.01); *B60W 2520/28* (2013.01); *B60W 2552/35* (2020.02)

(58) Field of Classification Search
  CPC ............ B60W 30/02; B60W 2552/00; B60W 2520/28; G01M 17/021; G07C 5/0808; G07C 5/08; B60R 16/0232; B60Y 2400/3032; B60Y 2400/304; B60T 8/32; B60T 8/03
  See application file for complete search history.

(56) References Cited

U.S. PATENT DOCUMENTS

| | | | | |
|---|---|---|---|---|
| 5,670,716 A | * | 9/1997 | Tamasho | B60C 23/061 340/444 |
| 6,060,983 A | * | 5/2000 | Yanase | B60C 23/061 73/146 |
| 6,434,457 B2 | * | 8/2002 | Okita | B60T 8/885 701/76 |
| 2003/0201880 A1 | | 10/2003 | Lu | |

(Continued)

FOREIGN PATENT DOCUMENTS

| CN | 101716873 A | * | 6/2010 |
|---|---|---|---|
| CN | 105946473 A | * | 9/2016 |

(Continued)

*Primary Examiner* — Erin M Piateski
*Assistant Examiner* — Ashley Tiffany Schoech
(74) *Attorney, Agent, or Firm* — CANTOR COLBURN LLP

(57) ABSTRACT

A vehicle includes a system performing a method of controlling an operation of the vehicle during a tire blowout. The system includes a vehicle dynamics sensor for detecting a dynamic parameter of the vehicle, tire sensors for detecting wheel speeds of wheels of the vehicle, and a processor. The processor is configured to receive a velocity of the vehicle from the vehicle dynamics sensor and the wheel speeds from the tire sensors, determine a diagonal product ratio of the wheel speeds, compare the diagonal product ratio to a range to detect an occurrence of a tire blowout, identify a location of the tire blowout from a wheel speed ratio based on wheels that are diagonally opposite each other, and control the operation of the vehicle in response to the tire blowout.

20 Claims, 8 Drawing Sheets

(56) References Cited

U.S. PATENT DOCUMENTS

2016/0201277 A1\* 7/2016 Svantesson ............. E01C 23/01
73/146
2021/0213935 A1\* 7/2021 Lu ........................... B60C 23/04

FOREIGN PATENT DOCUMENTS

| JP | H07186643 A | \* | 7/1995 | ........... B60C 23/061 |
| JP | H08216636 A | \* | 8/1996 | ........... B60C 23/061 |
| JP | H10230717 A | \* | 9/1998 | ........... B60C 23/061 |
| KR | 19980085529 A | \* | 5/1997 | |
| KR | 20060005225 A | \* | 1/2006 | |

\* cited by examiner

SYSTEM AND METHOD FOR TIRE BLOWOUT DETECTION USING WHEEL SPEEDS

INTRODUCTION

The subject disclosure relates to tire blowouts in vehicles and, in particular, to a system and method for detecting the onset of a tire blowout using wheel speeds.

Tires are the main components that provide longitudinal and lateral forces for vehicle control. However, tires operate in an open environment and tire blowouts may occur for various reason, affecting vehicle dynamics. While algorithms have been developed for controlling the vehicle upon tire blowout, their timely initiation and effectiveness depends on knowledge of when and where a tire blowout occurs. Accordingly, it is desirable to provide a method for detecting the occurrence of a tire blowout at its onset.

SUMMARY

In one exemplary embodiment, a method of controlling an operation of a vehicle during a tire blowout is disclosed. A velocity of the vehicle is detected. Wheel speeds of wheels of the vehicle are detected. A diagonal product ratio of the wheel speeds is determined. The diagonal product ratio is compared to a range to detect an occurrence of the tire blowout. A location of the tire blowout is identified from a wheel speed ratio based on wheels that are diagonally opposite each other. Operation of the vehicle is controlled in response to the tire blowout.

In addition to one or more of the features described herein, the diagonal product ratio is a ratio of the products of the wheel speeds for wheels that are diagonally opposite each other. The method further includes identifying a diagonal pair of wheels having the tire blowout using the diagonal product ratio and a longitudinal acceleration of the vehicle and identifying the location of the tire blowout within the diagonal pair of wheels based on the wheel speed ratio for the wheels of the diagonal pair of wheels. The method further includes setting a flag when the diagonal product ratio is outside of the range. The method further includes obtaining a count of a number of times in which the diagonal product ratio is outside of the range within a time interval and determining the tire blowout when the count is greater than a flag count threshold. The method further includes detecting a vertical acceleration of the vehicle and determining, based on the vertical acceleration, that the count is greater than the flag count threshold due to one of road roughness and the tire blowout. The range is one of a calibrated range and a learned range that is learned from wheel speed data generated while the vehicle is being driven.

In another exemplary embodiment, a system for controlling an operation of a vehicle is disclosed. The system includes a vehicle dynamics sensor for detecting a dynamic parameter of the vehicle, tire sensors for detecting wheel speeds of wheels of the vehicle, and a processor. The processor is configured to receive a velocity of the vehicle from the vehicle dynamics sensor and the wheel speeds from the tire sensors, determine a diagonal product ratio of the wheel speeds, compare the diagonal product ratio to a range to detect an occurrence of a tire blowout, identify a location of the tire blowout from a wheel speed ratio based on wheels that are diagonally opposite each other, and control the operation of the vehicle in response to the tire blowout.

In addition to one or more of the features described herein, the diagonal product ratio is a ratio of products of wheel speeds for wheels that are diagonally opposite each other. The processor is further configured to a diagonal pair of wheels having the tire blowout using the diagonal product ratio and a longitudinal acceleration of the vehicle and identifying the location of the tire blowout within the diagonal pair of wheels based on the wheel speed ratio for the wheels of the diagonal pair of wheels. The processor is further configured to set a flag when the diagonal product ratio is outside of the range. The processor is further configured to obtain a count of a number of flags within a time interval and determining the tire blowout when the count is greater than a flag count threshold. The processor is further configured to receive a vertical acceleration of the vehicle from the vehicle dynamics sensor and determine, based on the vertical acceleration, that the count is greater than the flag count threshold due to one of road roughness and the tire blowout. The range is one of a calibrated range and a learned range that is learned from wheel speed data generated while the vehicle is being driven.

In yet another exemplary embodiment, a vehicle is disclosed. The vehicle includes a vehicle dynamics sensor for detecting a dynamic parameter of the vehicle, tire sensors for detecting wheel speeds of wheels of the vehicle, and a processor. The processor is configured to receive a velocity of the vehicle from the vehicle dynamics sensor and the wheel speeds from the tire sensors, determining a diagonal product ratio of the wheel speeds, compare the diagonal product ratio to a range to detect an occurrence of a tire blowout, identify a location of the tire blowout from a wheel speed ratio based on wheels that are diagonally opposite each other, and control an operation of the vehicle in response to the tire blowout.

In addition to one or more of the features described herein, the diagonal product ratio is a ratio of products of wheel speeds for wheels that are diagonally opposite each other. The processor is further configured to a diagonal pair of wheels having the tire blowout using the diagonal product ratio and a longitudinal acceleration of the vehicle and identifying the location of the tire blowout within the diagonal pair of wheels based on the wheel speed ratio for the wheels of the diagonal pair of wheels. The processor is further configured to set a flag when the diagonal product ratio is outside of the range. The processor is further configured to obtain a count of a number of flags within a time interval and determining the tire blowout when the count is greater than a flag count threshold. The processor is further configured to receive a vertical acceleration of the vehicle from the vehicle dynamics sensor and determine, based on the vertical acceleration, that the count is greater than the flag count threshold due to one of road roughness and the tire blowout.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
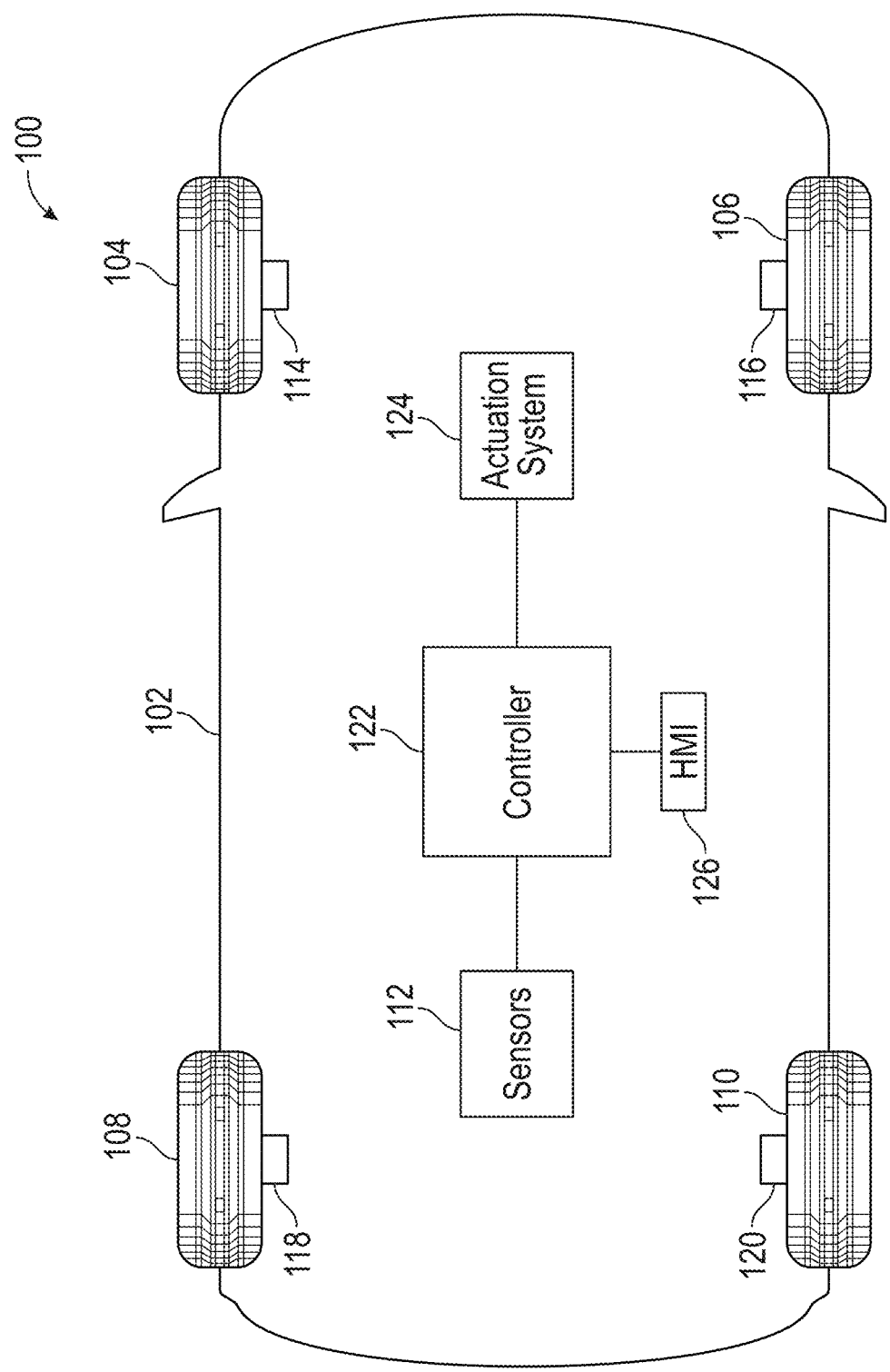
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100. The vehicle 100 includes a body 102 having a front left tire 104, a front right tire 106, a rear left tire 108, and a rear right tire 110, all of which interact with the environment (i.e., the road) to move the vehicle. As discussed herein, the front left tire 104 can referred to using either FL or $w_1$, the front right tire 106 can be referred to using either FR or $w_2$, the rear left tire 108 can be referred to using either RL or $w_3$, and the rear right tire 110 can be referred to using either RR or $w_4$.

One or more vehicle dynamics sensors 112 can be used to measure dynamic parameters of the vehicle, such as vehicle's acceleration, the vehicle's speed, etc. Additionally, each tire has an associated sensor (i.e., tire sensors 114, 116, 118 and 120) that records dynamic properties of the associated tire, such as a rotational speed of the tire, a rotational acceleration of the tire, an acceleration of the tire in the z-direction, etc. The data from the one or more vehicle dynamics sensors 112 as well as from tire sensors 114, 116, 118 and 120 can be sent to a controller 122.

The controller 122 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 122 may include a non-transitory computer-readable medium that stores instructions which, when processed by one or more processors of the controller 122, implement a method of detecting a tire blowout at the vehicle and control operation of the vehicle to perform remedial action in response to the tire blowout, according to one or more embodiments detailed herein.

The vehicle 100 further includes an actuation system 124 and a human machine interface 126. The human machine interface 126 can include a display, a speaker and/or a mobile device. The controller 122 can send one or more signals to the actuation system 124 to control the operation of the vehicle 100. The controller 122 can also send a driver notification to the human machine interface 126.

Figure 2:
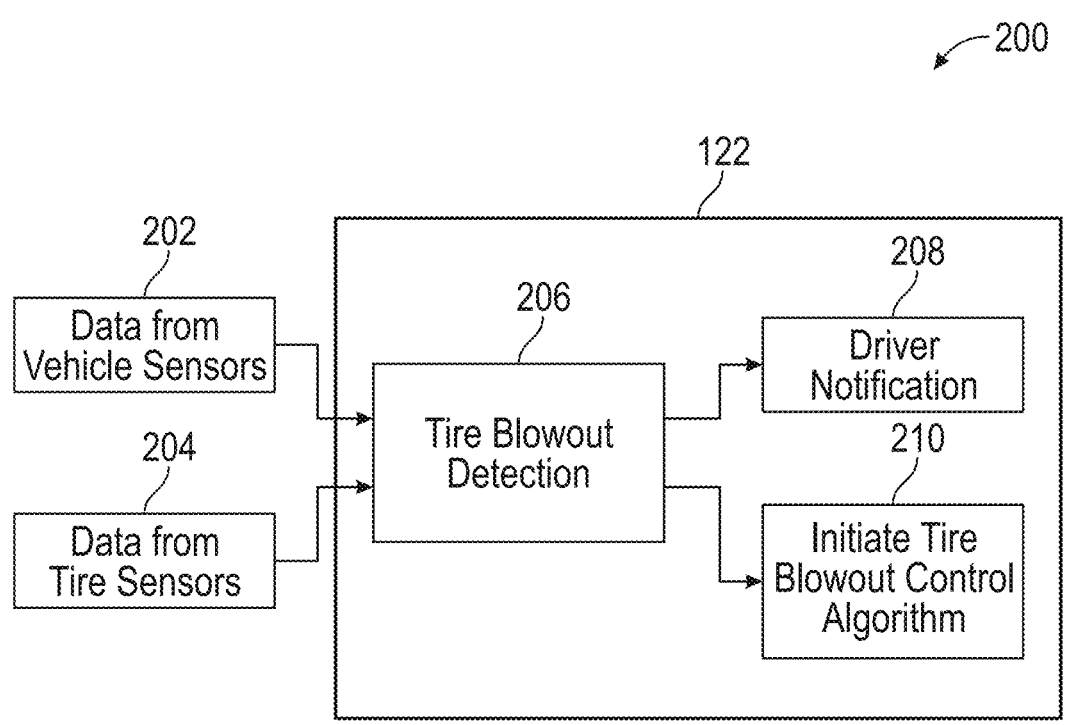
FIG. 2 shows a schematic diagram of data flow in the vehicle to detect and react to a tire blowout.

FIG. 2 shows a schematic diagram 200 of data flow in the vehicle 100 to detect and react to a tire blowout. Vehicle data 202 from the vehicle sensors and tire data 204 from the tire sensors are sent to the controller 122. The controller 122 receives the vehicle data 202 and tire data 204 and performs a tire blowout detection program 206 to determine whether the parameters indicate a normal or acceptable operation of the wheel or the occurrence of a tire blowout.

When the tire blowout detection program 206 determines that a tire blowout has occurred, the controller 122 can send a driver notification message 208 to the human machine interface 126. Alternatively, or additionally, the controller 122 can send a signal to initiate a tire blowout control algorithm 210, which causes the actuation system 124 of the vehicle 100 to take a remedial action in response to the tire blowout. This action can be a deceleration of the vehicle, etc.

Figure 3:
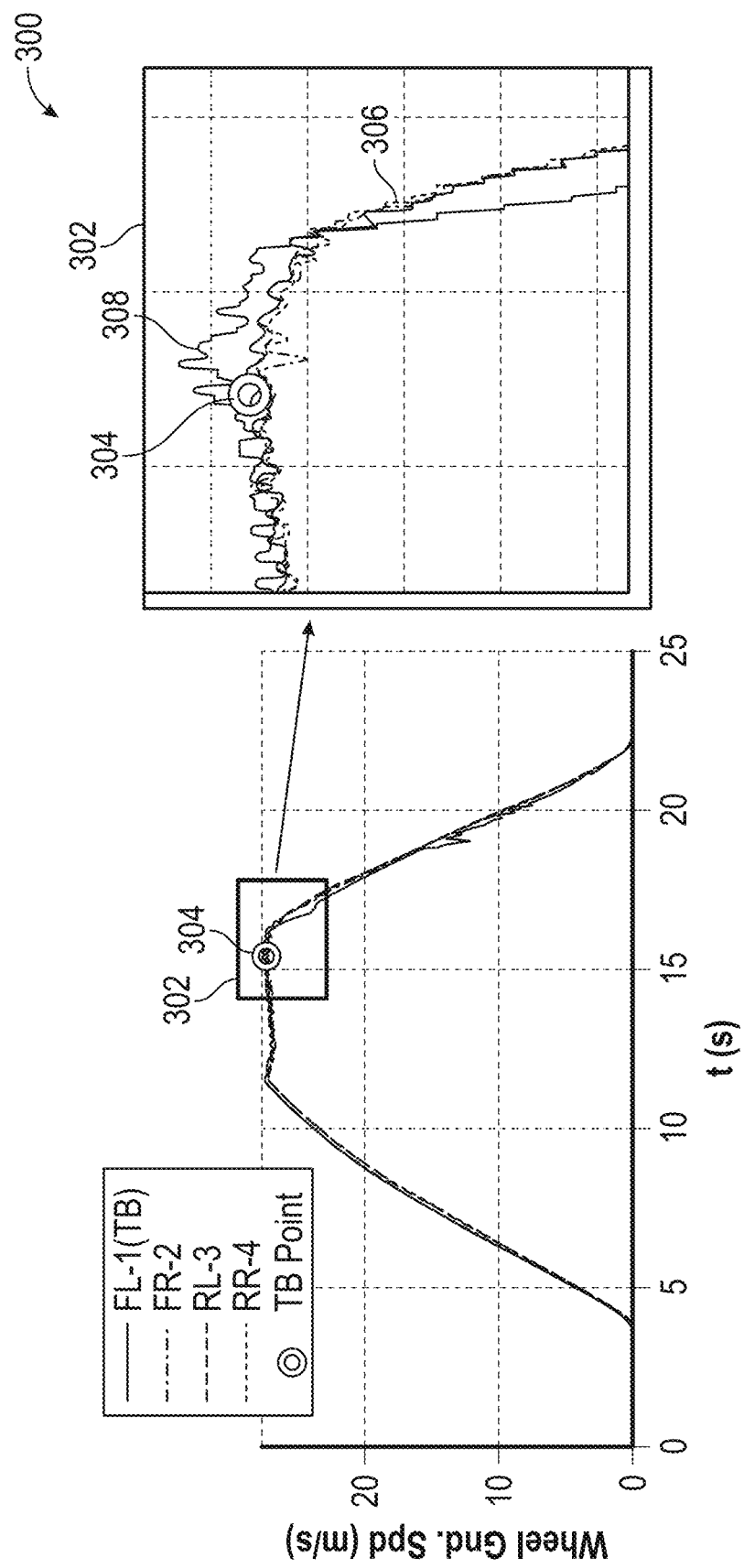
FIG. 3 shows a graph of wheel speed in an illustrative scenario in which the vehicle experiences a tire blowout.

FIG. 3 shows a graph 300 of wheel speed in an illustrative scenario in which the vehicle experiences a tire blowout. Time is shown along the abscissa in second(s) and wheel ground speed is shown along the ordinate axis in meters/second (m/s). The illustrative scenario includes an operation in which the vehicle 100 is at stop during a time interval from about 0 seconds to about 4 seconds and accelerates during a time interval from about 4 seconds to about 11 seconds. During a time interval from about 11 seconds to about 17 seconds, the vehicle 100 remains at a substantially constant speed. During a time interval from 17 seconds to about 22 seconds, the vehicle 100 decelerates to a stop. A region 302 of the graph 300 is centered about a time at which the tire blowout 304 occurs (i.e., about 16 seconds). An expansion of the region 302 shows the speeds of each tire can be seen. A first curve 306 collectively represents the wheel speeds for wheels $w_2$, $w_3$, $w_4$. A second curve 308 represents the wheel speeds for wheel $w_1$ (front left wheel). A clear divergence can be seen between the first curve 306 and the second curve 308 immediately after the tire blowout 304. The difference between the speed of wheel $w_1$ and the speeds of wheels $w_2$, $w_3$, $w_4$ are used to determine the presence of the tire blowout at wheel $w_1$, as discussed herein.

FIGS. 4-8 shows graphs of wheel speed of a vehicle under normal operation in which differences can occur in wheel speeds that are not associated with a tire blowout.

Figure 4:
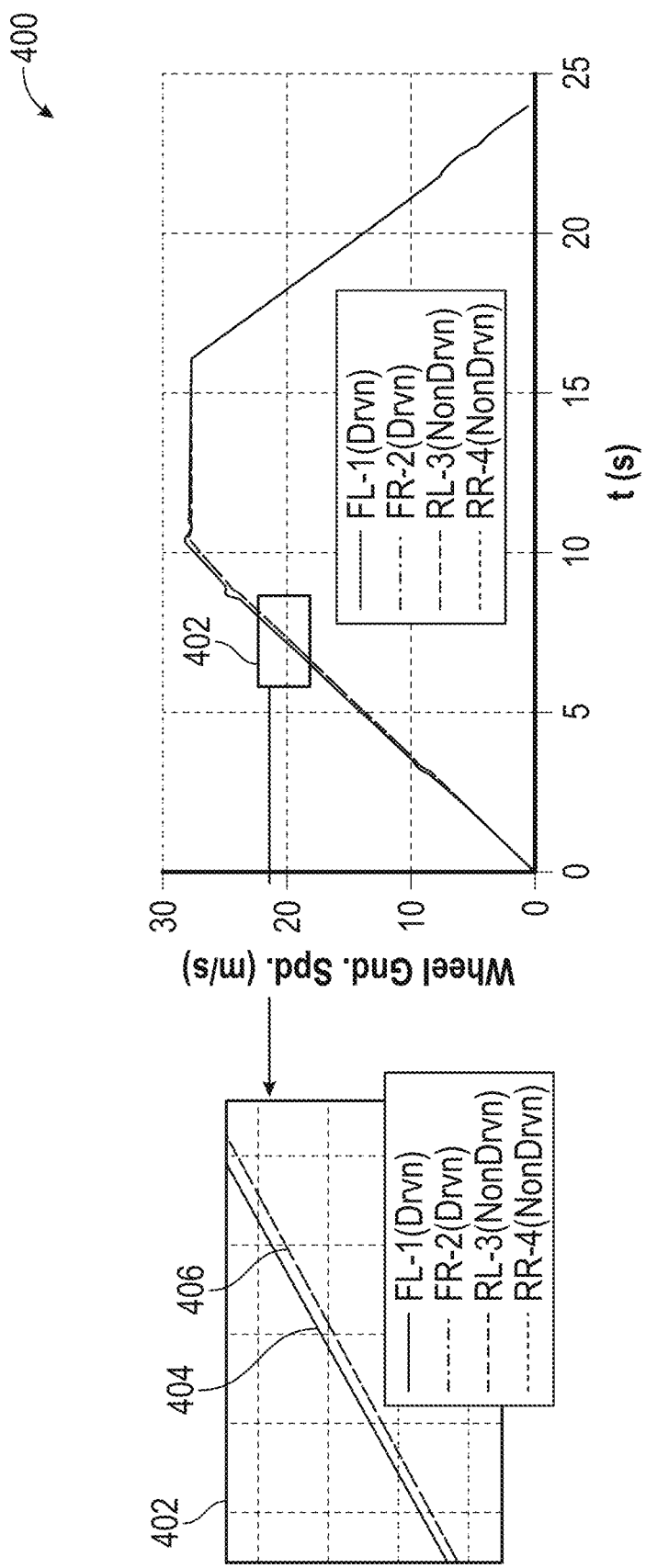
FIG. 4 shows a graph illustrating wheel speeds at front wheels and rear wheels during an acceleration.

FIG. 4 shows a graph 400 illustrating wheel speeds at front wheels and rear wheels during an acceleration. Time is shown along the abscissa in second(s) and wheel ground speed is shown along the ordinate axis in meters/second (m/s). For illustrative purposes, the front wheels are driven wheels while the rear wheels are non-driven wheels. An acceleration is shown occurring during a time interval from about 0 seconds to about 10 seconds. Region 402 is shown around the speed curves of the wheels. An expansion of region 402 shows the front wheel speeds 404 and the rear wheel speeds 406. At any given moment during the acceleration of the vehicle, the front wheel speeds 404 will be slightly greater than the rear wheel speeds 406.

Figure 5:
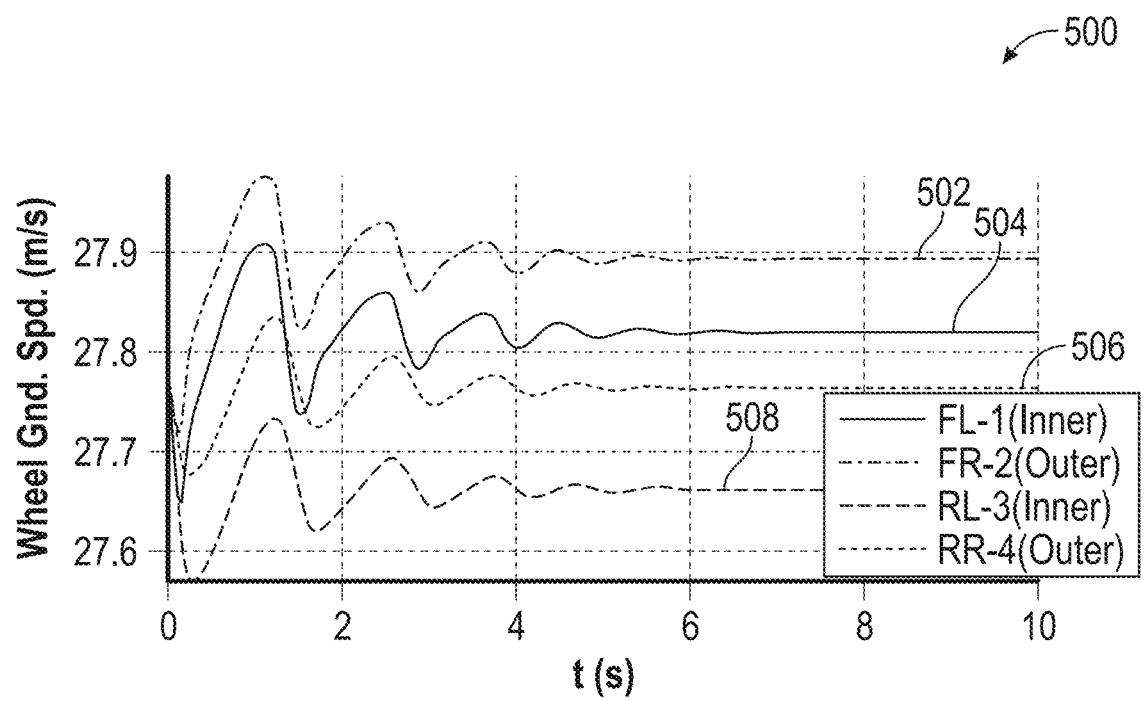
FIG. 5 shows a graph illustrating wheel speeds during a turn.

FIG. 5 shows a graph 500 illustrating wheel speeds during a turn. Time is shown along the abscissa in second(s) and wheel ground speed is shown along the ordinate axis in meters/second (m/s). For illustrative purposes, the turn is to the left, thereby placing the right wheels (passenger side) on the outside of the curve and the left wheels (driver side) on the inside of the curve. Curve 502 is the speed of the front right tire $w_2$ (on the outside of the turn). Curve 504 is the speed of the front left tire $w_1$ (on the inside of the turn). Curve 506 is the velocity of the rear right tire $w_4$ (on the outside of the turn). Curve 508 is the speed of the rear left tire $w_3$ (on the inside of the turn). The outside wheels have greater speeds than their paired wheel on the inside of the curve. For example, front right wheel $w_2$ has a greater speed (curve 502) than front left wheel $w_1$ (curve 504), and rear right wheel $w_4$ has a greater speed (curve 506) than rear left wheel $w_3$ (curve 508).

Figure 6:
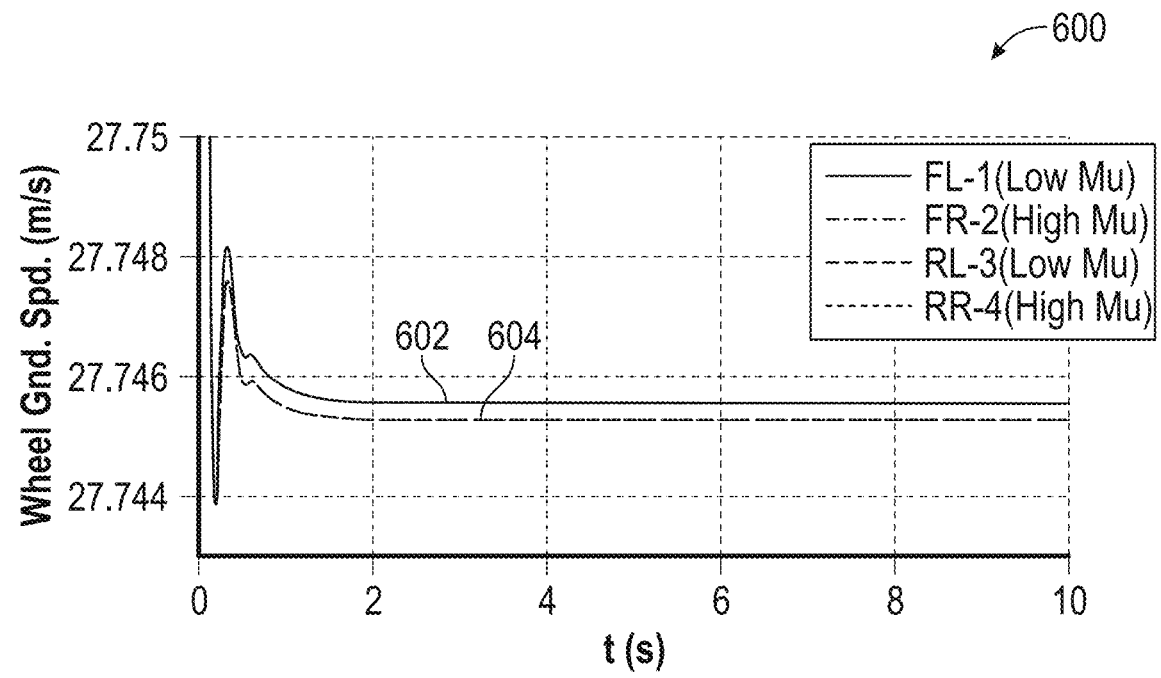
FIG. 6 shows a graph illustrating differences between wheel speeds during a split-μ event.

FIG. 6 shows a graph 600 illustrating differences between wheel speeds during a split-μ event. A split-μ event is an event in which the coefficient of friction (μ) for one tire is different that the coefficient of friction for another tire. This event can be due to due to ice, snow, etc. and can cause a slip to occur at one or more of the tires. Time is shown along the abscissa in second(s) and wheel ground speed is shown along the ordinate axis in meters/second (m/s). For the scenario shown in graph 600, the left side of the vehicle 100 is in contact with a slippery path of the road (such as a strip of ice) while the right side of the vehicle is in contact with the road directly. Curve 602 shows the speeds of front left wheel $w_1$ and rear left wheel $w_3$. Curve 604 shows the speeds of front right wheel $w_2$ and rear right wheel $w_4$. Curve 602 is greater than curve 604, thereby illustrating the differences in speeds due to the split-μ event.

Figure 7:
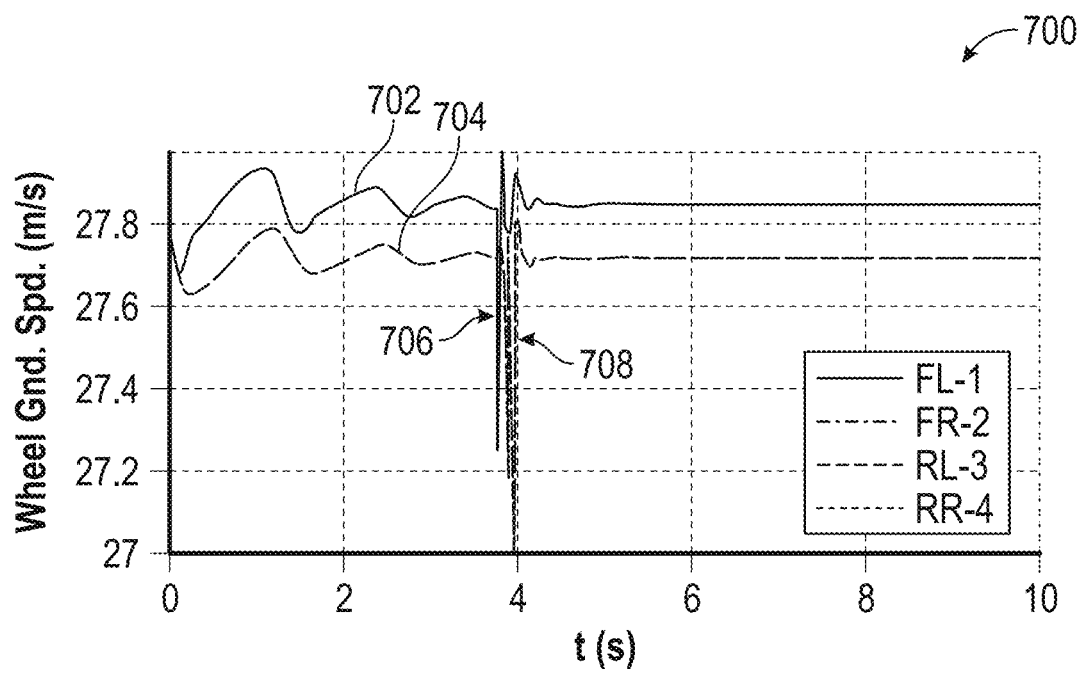
FIG. 7 shows a graph illustrating differences between wheel speeds when a speed bump or small obstacle is hit.

FIG. 7 shows a graph 700 illustrating differences between wheel speeds when a speed bump or small obstacle is hit. Time is shown along the abscissa in second(s) and wheel ground speed is shown along the ordinate axis in meters/second (m/s). Curve 702 represents the speeds of the front left wheel $w_1$ and the front right wheel $w_2$. Curve 704 represents the speeds of the rear left wheel $w_3$ and the rear right wheel $w_4$. The effect of the speed bump is shown at about 4 seconds. The front wheels hit the speed bump first as shown by a first spike 706, followed by the rear wheels, as shown by second spike 708. The time between onset of the first spike 706 and onset of the second spike 708 is short (about 0.1 seconds). For each of the wheels, the recovery to the original speed is quick.

Figure 8:
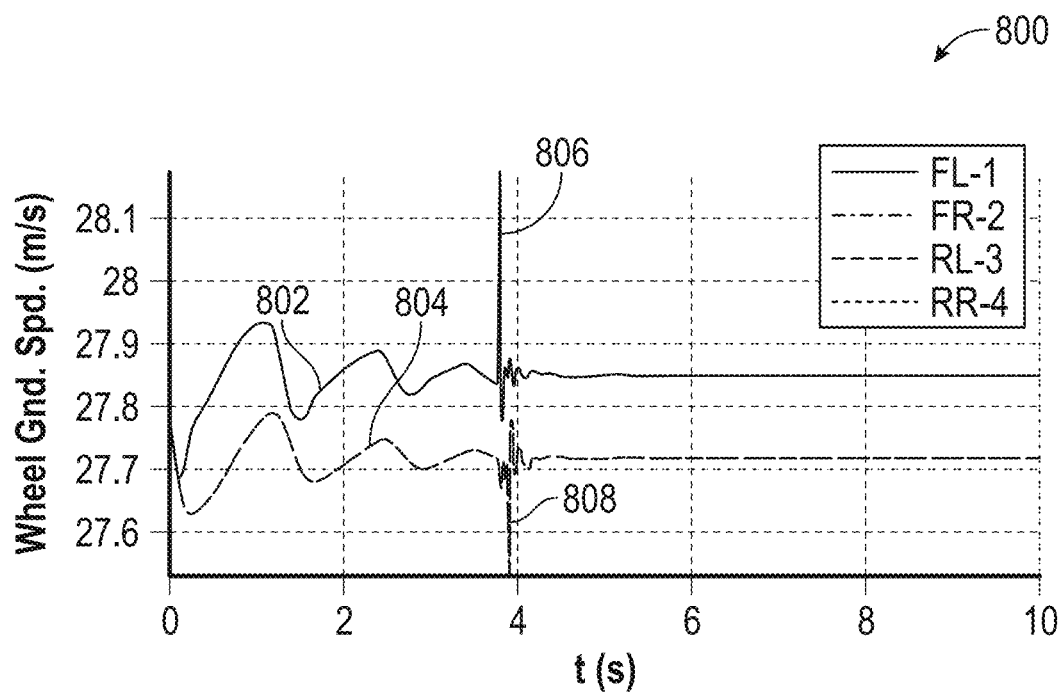
FIG. 8 shows a graph illustrating differences between wheel speeds when a pothole is hit.

FIG. 8 shows a graph 800 illustrating differences between wheel speeds when a pothole is hit. Time is shown along the abscissa in second(s) and wheel ground speed is shown along the ordinate axis in meters/second (m/s). Curve 802 represents the speeds of the front left wheel $w_1$ and the front right wheel $w_2$. Curve 804 represents the speeds of the rear left wheel $w_3$ and the rear right wheel $w_4$. A first spike 806 occurs in the speeds of the front left wheels $w_1$ and front right wheel $w_2$. The first spike 806 is followed shortly by a second spike 808 in the speeds of the rear left wheel $w_3$ and rear right wheel $w_4$. Recover to the original speed is quick.

Figure 9:
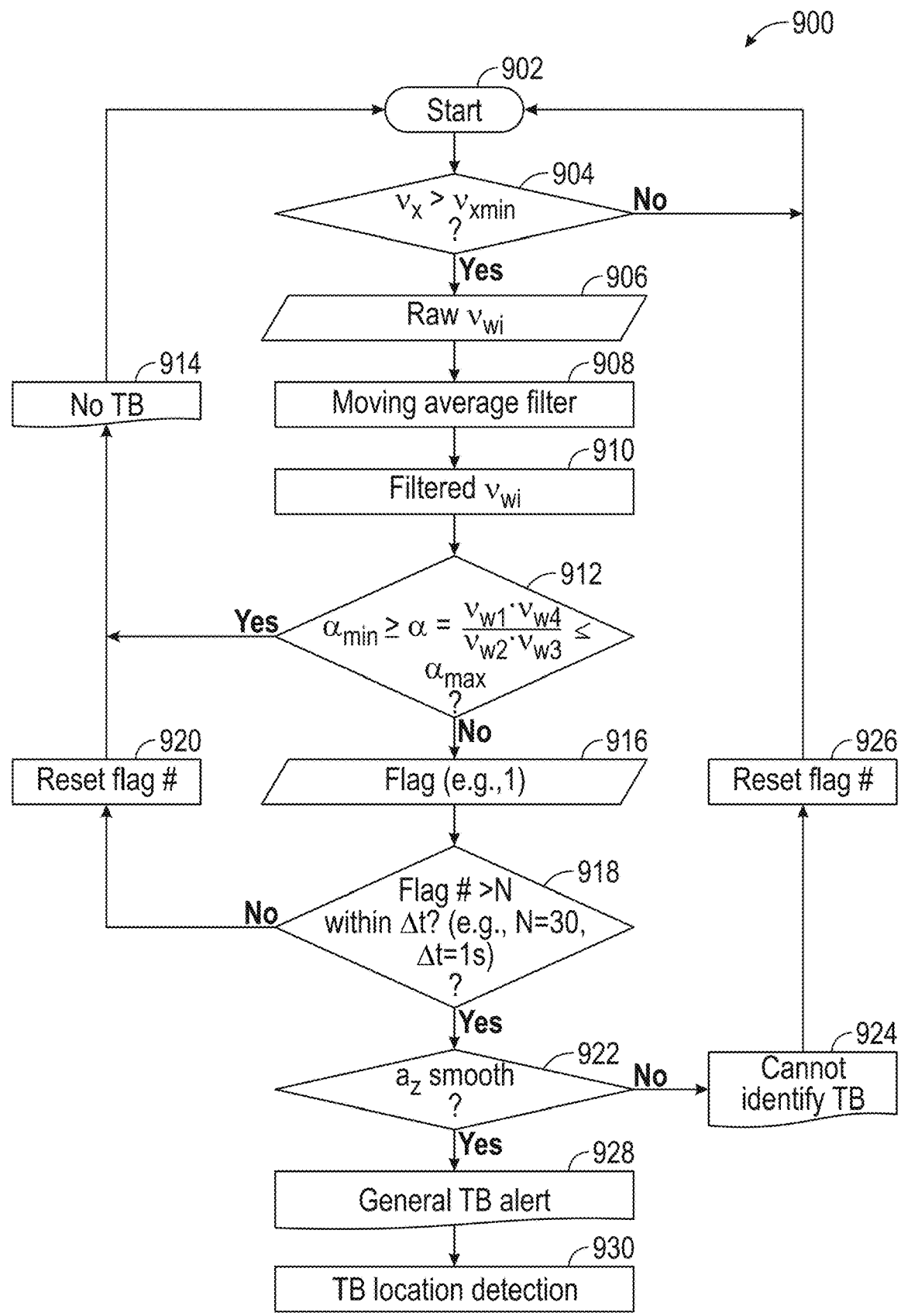
FIG. 9 is a flowchart of a method for discerning a tire blowout from other non-blowout events.

FIG. 9 is a flowchart 900 of a method for discerning a tire blowout from other non-blowout events. The method begins at box 902. At box 904, a longitudinal velocity vx of the vehicle is measured. If the longitudinal velocity $v_x$ is less than or equal to a minimum velocity $v_{x\_min}$ (i.e., $v_x \leq v_{x\_min}$) then the method returns to box 902. If, at box 904, the longitudinal velocity vx is greater than the minimum velocity (i.e., $v_x > v_{x\_min}$) then the method proceeds to box 906. In box 906, measurements are obtained of the wheel speeds (i.e., $v_{w1}$, $v_{w2}$, $v_{w3}$, $v_{w4}$) over a time interval. In box 908, a moving average filter is applied to the wheel speeds to obtain filtered wheel speeds in box 910. In box 912, a diagonal product ratio is calculated from the filtered wheel speeds. The diagonal product ratio is a ratio of diagonal products of wheel speeds. A diagonal product is a product of wheel speeds from tires that are diagonally opposite each other on the vehicle. The diagonal product ratio is indicated by the value a and is calculated as shown in Eq. (1):

$$\alpha = ((v_{w1} \cdot v_{w4})/(v_{w2} \cdot v_{w3})) \qquad \text{Eq. (1)}$$

where $v_{w1}$ is the speed of the front left wheel, $v_{w2}$ is the speed of the front right wheel, $v_{w3}$ is the speed of the rear left wheel and $v_{w4}$ is the speed of the rear right wheel.

In box 912, the diagonal product ratio is compared to a ratio range as shown in Eq. (2):

$$\alpha_{min} \leq \alpha \leq \alpha_{max} \qquad \text{Eq. (2)}$$

where $\alpha_{min}$ is a minimum value for the range and $\alpha_{max}$ is a maximum value for the range. The range $[\alpha_{min}, \alpha_{max}]$ can be a calibrated range in which a certain percentage of normal driving falls or a learned range that is learned from wheel speed data generated while the vehicle is being driven. This range can be used to rule out scenarios in which a wheel speed varies without the occurrence of a tire blowout, such as the scenarios shown in FIGS. 4-8. If the diagonal product ratio is within the range (i.e., Eq. (2) is true), the method proceeds to box 914. In box 914, the state of the tire is marked as having no tire blowout. The method then returns to box 902. Returning to box 912, if the diagonal product ratio falls outside of the range (i.e., Eq. (2) is false), the method proceeds to box 916. In box 916, a flag is set and counted. The diagonal product ratio α is checked over a plurality of sample times or sub-intervals of the time interval. In box 918, the count of the flags (i.e., the number of times a flag has been set within the stated interval) is compared to a flag count threshold N.

In box 918, if the count is less than the flag count threshold within the time interval, the method proceeds to box 920. In box 920, the flag count is reset. From box 920, the method proceeds to box 914 ("no tire blowout") and then to box 902. Returning to box 918, if the flag count is greater than or equal to the flag count threshold within the time interval, the method proceeds to box 922. In box 922, the vertical acceleration $a_z$ of the vehicle over a time interval is reviewed. The vertical acceleration can be reviewed to eliminate the effect of road roughness or to attribute the flag count to high road roughness rather than to a tire blowout. If the vertical acceleration is not a smooth curve, within a given criterion, the method proceeds to box 924. In box 924, it is determined that a tire blowout cannot be identified. From box 924, the method proceeds to box 926 and then returns to box 902. In box 926, the flag count is reset. The method then proceeds to box 902.

Returning to box 922, if the vertical acceleration is a smooth curve, the method proceeds to box 928. In box 928, an alert or signal is generated to indicate that a tire blowout has occurred. In box 930, a tire blowout location detection algorithm, such as shown in FIG. 10, is performed.

Figure 10:
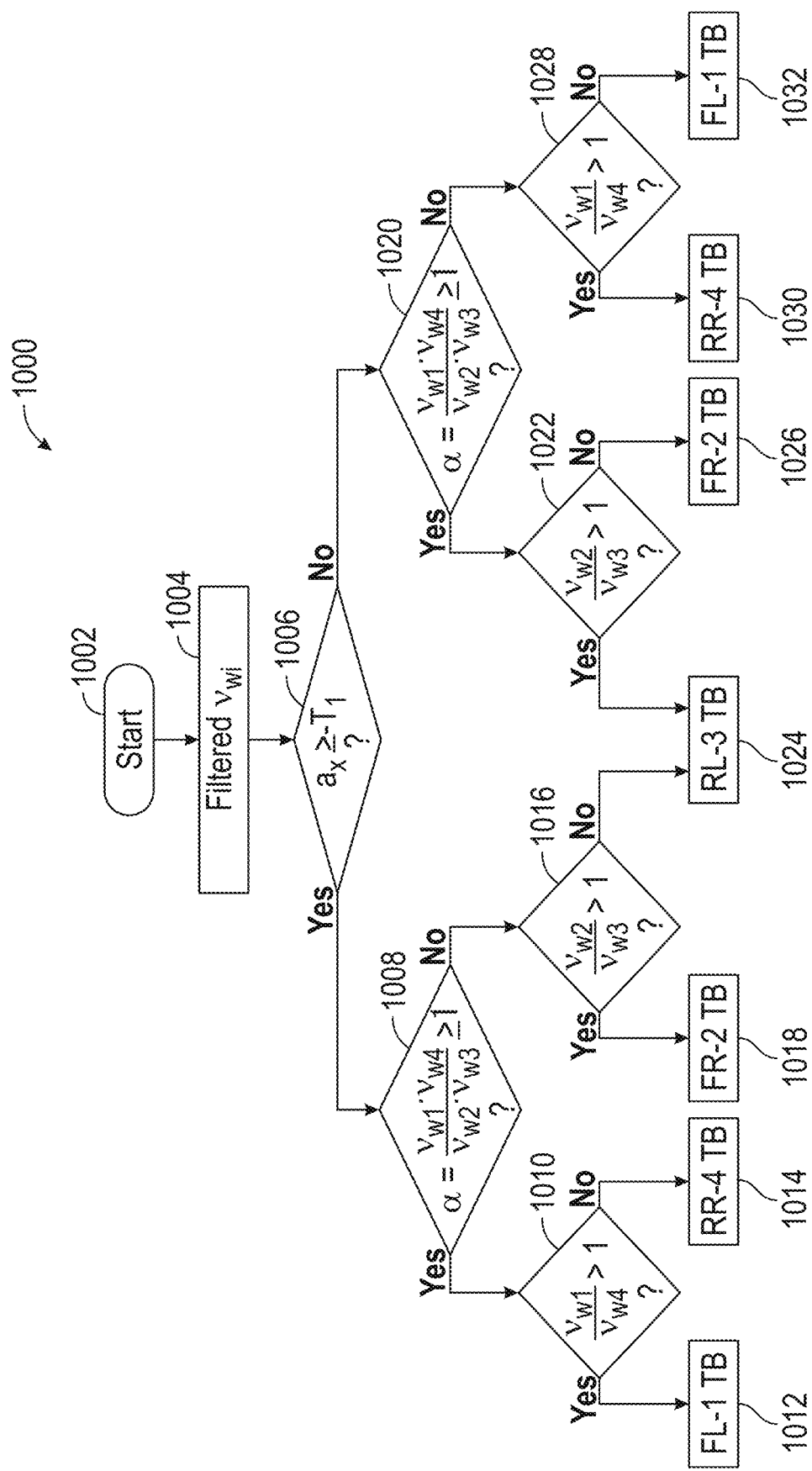
FIG. 10 shows a flowchart of a method for determining which tire has a blowout, in an illustrative embodiment.

FIG. 10 shows a flowchart 1000 of a method for determining which tire has a blowout, in an illustrative embodiment. The method includes identifying in which diagonal pair of wheels (i.e., ($w_1$, $w_4$) or ($w_2$, $w_3$)) the tire blowout has occurred using the diagonal pair product and then identifying the location of the tire blowout within the diagonal pair from a ratio of wheel speeds for the wheels in the diagonal pair (referred to herein as "diagonal wheel speed ratio"). The method beings at box 1002. In box 1004, the wheel speeds $v_{wi}$ for each wheel are obtained and filtered. In box 1006, the longitudinal acceleration $a_x$ of the vehicle is compared to a threshold value $(-T_1)$, which is a calibrated value. Since a blown-out tire tends to speed up or slow down depending on whether the vehicle 100 is accelerating (or at a constant speed) or decelerating, respectively, the method first checks whether the vehicle is accelerating (or at constant speed) or decelerating. If the longitudinal acceleration is greater than or equal to the threshold value, the method proceeds to box 1008. Otherwise, the method proceeds to box 1020.

Referring first to box 1008, the diagonal product ratio α is compared to 1. The comparison of the diagonal product ratio α to 1 is used to discern a tire blowout occurrence from scenarios shown in FIGS. 4-8. If α>=1, then the tire blowout is in either the front left tire ($w_1$) or the rear right tire ($w_4$) and the method proceeds to box 1010. In box 1010, a diagonal wheel speed ratio is tested for these tires, as shown in Eq. (3):

$$v_{w1}/v_{w4} > 1 \quad \text{Eq. (3)}$$

If Eq. (3) is true, then the method proceeds to box 1012. Otherwise, the method proceeds to box 1014. The outcome of Eq. (3) indicates which wheel has the greater speed (e.g., $v_{w1}$ or $v_{w4}$). In box 1012, output is generated to identify the front left tire as having the tire blowout and taking an action to address the blowout. In box 1014, output is generated to identify the rear right tire as having the tire blowout and taking an action to address the blowout.

Returning to box 1008, if α<1, then the tire blowout is in either the front right tire ($w_2$) or the rear left tire ($w_3$) and the method proceeds to box 1016. In box 1016, a diagonal wheel speed ratio is tested for these tires, as shown in Eq. (4):

$$v_{w2}/v_{w3} > 1 \quad \text{Eq. (4)}$$

If Eq. (4), then the method proceeds to box 1018. Otherwise, the method proceeds to box 1024. In box 1018, output is generated to identify the front right tire as having the tire blowout and taking an action to address the blowout. In box 1024, output is generated to identify the rear left tire as having the tire blowout and taking an action to address the blowout.

Referring now to box 1020, the diagonal product ratio α is compared to 1. The comparison of the diagonal product ratio α to 1 is used to discern a tire blowout occurrence from scenarios shown in FIGS. 4-8. If α>=1, then the tire blowout is in either the front right tire ($w_2$) or the rear left tire ($w_3$) and the method proceeds to box 1022. In box 1022 a diagonal wheel speed ratio is tested for these tires, as shown in Eq. (4). If Eq. (4) is true, then the method proceeds to box 1024. Otherwise, the method proceeds to box 1026. In box 1024, output is generated to identify the rear left tire as having the tire blowout and taking an action to address the blowout. In box 1026, output is generated to identify the front right tire as having the tire blowout and taking an action to address the blowout.

Returning to box 1020, if α<1, then the tire blowout is in either the front left tire ($w_1$) or the rear right tire ($w_4$) and the method proceeds to box 1028. In box 1028 a diagonal wheel speed ratio is tested for these tires, as shown in Eq. (3). If Eq. (3) is true, then the method proceeds to box 1030. Otherwise, the method proceeds to box 1032. In box 1030, output is generated to identify the rear right tire as having the tire blowout and taking an action to address the blowout. In box 1032, output is generated to identify the front left tire as having the tire blowout and taking an action to address the blowout.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of controlling an operation of a vehicle during a tire blowout, comprising:
   detecting a velocity of the vehicle;
   detecting wheel speeds of wheels of the vehicle;
   determining a diagonal product ratio of the wheel speeds;
   comparing the diagonal product ratio to a range to select a diagonal pair of wheels having a wheel with the tire blowout;
   identifying the wheel having the tire blowout from a diagonal wheel speed ratio based on a first speed of a first wheel of the diagonal pair of wheels and a second speed of a second wheel of the diagonal pair of wheels; and
   controlling the operation of the vehicle in response to the tire blowout.

2. The method of claim 1, wherein the diagonal product ratio is a ratio of the products of the wheel speeds for wheels that are diagonally opposite each other.

3. The method of claim 1, further comprising identifying the diagonal pair of wheels having the tire blowout using the diagonal product ratio and a longitudinal acceleration of the vehicle and identifying the location of the tire blowout within the diagonal pair of wheels based on the wheel speed ratio for the wheels of the diagonal pair of wheels.

4. The method of claim 1, further comprising setting a flag when the diagonal product ratio is outside of the range.

5. The method of claim 4, further comprising obtaining a count of a number of times in which the diagonal product ratio is outside of the range within a time interval, detecting a vertical acceleration of the vehicle over the time interval, and determining the tire blowout when the count is greater than a flag count threshold and the vertical acceleration is a smooth curve within a given criterion.

6. The method of claim 4, further comprising obtaining a count of a number of times in which the diagonal product ratio is outside of the range within a time interval, detecting a vertical acceleration of the vehicle over the time interval, and determining that the count is greater than the flag count threshold as a result of road roughness when the vertical acceleration is a rough curve within a given criterion.

7. The method of claim 1, wherein the range is one of a calibrated range and a learned range that is learned from wheel speed data generated while the vehicle is being driven.

8. A system for controlling an operation of a vehicle, comprising:
   a vehicle dynamics sensor for detecting a dynamic parameter of the vehicle;
   tire sensors for detecting wheel speeds of wheels of the vehicle; and
   a processor configured to:
      receive a velocity of the vehicle from the vehicle dynamics sensor and the wheel speeds from the tire sensors;
      determine a diagonal product ratio of the wheel speeds;
      compare the diagonal product ratio to a range to select a diagonal pair of wheels having a wheel with a tire blowout;
      identify the wheel having the tire blowout from a diagonal wheel speed ratio based on a first speed of a first wheel of the diagonal pair of wheels and a second speed of a second wheel of the diagonal pair of wheels; and
      control the operation of the vehicle in response to the tire blowout.

9. The system of claim 8, wherein the diagonal product ratio is a ratio of products of wheel speeds for wheels that are diagonally opposite each other.

10. The system of claim 8, wherein the processor is further configured to identify the diagonal pair of wheels having the tire blowout using the diagonal product ratio and a longitudinal acceleration of the vehicle and identify the location of the tire blowout within the diagonal pair of wheels based on the wheel speed ratio for the wheels of the diagonal pair of wheels.

11. The system of claim 8, wherein the processor is further configured to set a flag when the diagonal product ratio is outside of the range.

12. The system of claim 11, wherein the processor is further configured to obtain a count of a number of flags within a time interval, detect a vertical acceleration of the vehicle over the time interval, and determine the tire blowout when the count is greater than a flag count threshold and the vertical acceleration is a smooth curve within a given criterion.

13. The system of claim 11, wherein the processor is further configured to obtain a count of a number of times in which the diagonal product ratio is outside of the range within a time interval, receive a vertical acceleration of the vehicle from the vehicle dynamics sensor over the time interval, and determine that the count is greater than the flag count threshold as a result of road roughness when the vertical acceleration is a rough curve within a given criterion.

14. The system of claim 8, where the range is one of a calibrated range and a learned range that is learned from wheel speed data generated while the vehicle is being driven.

15. A vehicle, comprising:
   a vehicle dynamics sensor for detecting a dynamic parameter of the vehicle;
   tire sensors for detecting wheel speeds of wheels of the vehicle; and
   a processor configured to:
      receive a velocity of the vehicle from the vehicle dynamics sensor and the wheel speeds from the tire sensors;
      determine a diagonal product ratio of the wheel speeds;
      compare the diagonal product ratio to a range to select a diagonal pair of wheels having a wheel with a tire blowout;
      identify the wheel having the tire blowout from a diagonal wheel speed ratio based on a first speed of a first wheel of the diagonal pair of wheels and a second speed of a second wheel of the diagonal pair of wheels; and
      control an operation of the vehicle in response to the tire blowout.

16. The vehicle of claim 15, wherein the diagonal product ratio is a ratio of products of wheel speeds for wheels that are diagonally opposite each other.

17. The vehicle of claim 15, wherein the processor is further configured to identify the diagonal pair of wheels having the tire blowout using the diagonal product ratio and a longitudinal acceleration of the vehicle and identify the location of the tire blowout within the diagonal pair of wheels based on the wheel speed ratio for the wheels of the diagonal pair of wheels.

18. The vehicle of claim 15, wherein the processor is further configured to set a flag when the diagonal product ratio is outside of the range.

19. The vehicle of claim 18, wherein the processor is further configured to obtain a count of a number of flags within a time interval, detect a vertical acceleration of the vehicle over the time interval, and determine the tire blowout when the count is greater than a flag count threshold and the vertical acceleration is a smooth curve within a given criterion.

20. The vehicle of claim 18, wherein the processor is further configured to obtain a count of a number of times in which the diagonal product ratio is outside of the range within a time interval, receive a vertical acceleration of the vehicle from the vehicle dynamics sensor over the time interval and determine that the count is greater than the flag count threshold as a result of road roughness when the vertical acceleration is a rough curve within a given criterion.

\* \* \* \* \*